(12) United States Patent
Yang et al.

(10) Patent No.: US 11,812,462 B2
(45) Date of Patent: Nov. 7, 2023

(54) CSI ENHANCEMENT FOR NR SL AND UU

(71) Applicant: QUALCOMM Incorporated, San Diego, CA (US)

(72) Inventors: Wei Yang, San Diego, CA (US); Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 17/334,044

(22) Filed: May 28, 2021

(65) Prior Publication Data

US 2022/0386315 A1    Dec. 1, 2022

(51) Int. Cl.
*H04W 24/10* (2009.01)
*H04W 72/56* (2023.01)
*H04L 1/1812* (2023.01)
*H04L 5/00* (2006.01)
*H04W 72/21* (2023.01)

(52) U.S. Cl.
CPC .......... *H04W 72/56* (2023.01); *H04L 1/1812* (2013.01); *H04L 5/0048* (2013.01); *H04W 24/10* (2013.01); *H04W 72/21* (2023.01)

(58) Field of Classification Search
CPC . H04W 72/10; H04W 24/10; H04W 72/0413; H04L 1/1812; H04L 5/0048
USPC ......................................................... 370/329
See application file for complete search history.

(56) References Cited

U.S. PATENT DOCUMENTS

| 2021/0051681 | A1* | 2/2021 | Manolakos | ........... H04L 5/0057 |
| 2021/0099901 | A1* | 4/2021 | Huang | ................... H04L 1/1812 |
| 2022/0014338 | A1* | 1/2022 | Yoshioka | .............. H04W 8/005 |
| 2022/0311587 | A1* | 9/2022 | Cheng | .................. H04B 7/0626 |
| 2022/0312435 | A1* | 9/2022 | Ye | ..................... H04W 72/1242 |
| 2022/0337378 | A1* | 10/2022 | Zhang | ...................... H04L 1/06 |

(Continued)

FOREIGN PATENT DOCUMENTS

WO    2021028051 A1    2/2021

OTHER PUBLICATIONS

International Search Report and Written Opinion—PCT/US2022/025729—ISA/EPO—dated Aug. 2, 2022.

(Continued)

*Primary Examiner* — Christopher R Crompton
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for indicating sidelink CSI information to a base station. A UE and a base station may determine a priority of a sidelink CSI report on an uplink channel in association with a priority of one or more of at least one uplink transmission or at least one other sidelink transmission. The sidelink CSI report may correspond to one or more sidelink transmissions between the UE and at least one other UE. The UE may transmit, and the base station may receive, via the uplink channel, the sidelink CSI report based on the priority of the sidelink CSI report on the uplink channel being determined in association with the priority of the one or more of the at least one uplink transmission or the at least one other SL transmission.

30 Claims, 13 Drawing Sheets

(56) References Cited

U.S. PATENT DOCUMENTS

2022/0368504 A1* 11/2022 Zhao .................... H04L 5/0055

OTHER PUBLICATIONS

Lenovo, et al., "Discussion on Resource Allocation for NR Sidelink Mode 1", 3GPP TSG RAN WG1 #100bis-e, R1-2001968, 3rd Generation Partnership Project, Mobile Competence Centre, 650, Route Des Lucioles, F-06921 Sophia-Antipolis Cedex, France, vol. RAN WG1, No. E-Meeting, Apr. 20, 2020-Apr. 30, 2020, 6 Pages, Apr. 10, 2020, XP051873386.

* cited by examiner

CSI ENHANCEMENT FOR NR SL AND UU

TECHNICAL FIELD

The present disclosure relates generally to communication systems, and more particularly, to a channel state information (CSI) enhancement for sidelink and Uu.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may determine a sidelink (SL) channel state information (CSI) report corresponding to one or more SL transmissions between a user equipment (UE) and at least one other UE; determine a priority of the SL CSI report on an uplink (UL) channel in association with a priority of one or more of at least one UL transmission or at least one other SL transmission; and transmit, to a base station via the uplink channel, the SL CSI report based on the priority of the SL CSI report on the UL channel in association with the priority of the one or more of the at least one UL transmission or the at least one other SL transmission.

In another aspect of the disclosure, a method, a computer-readable medium, and an apparatus are provided. The apparatus may determine a priority of a SL CSI report corresponding to one or more SL transmissions between a UE and at least one other UE, the priority of the SL CSI report determined for an uplink (UL) channel in association with a priority of one or more of at least one UL transmission or at least one other SL transmission; and receive, from the UE on the uplink channel, the SL CSI report based on the priority of the SL CSI report on the UL channel being determined in association with the priority of the one or more of the at least one UL transmission or the at least one other SL transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
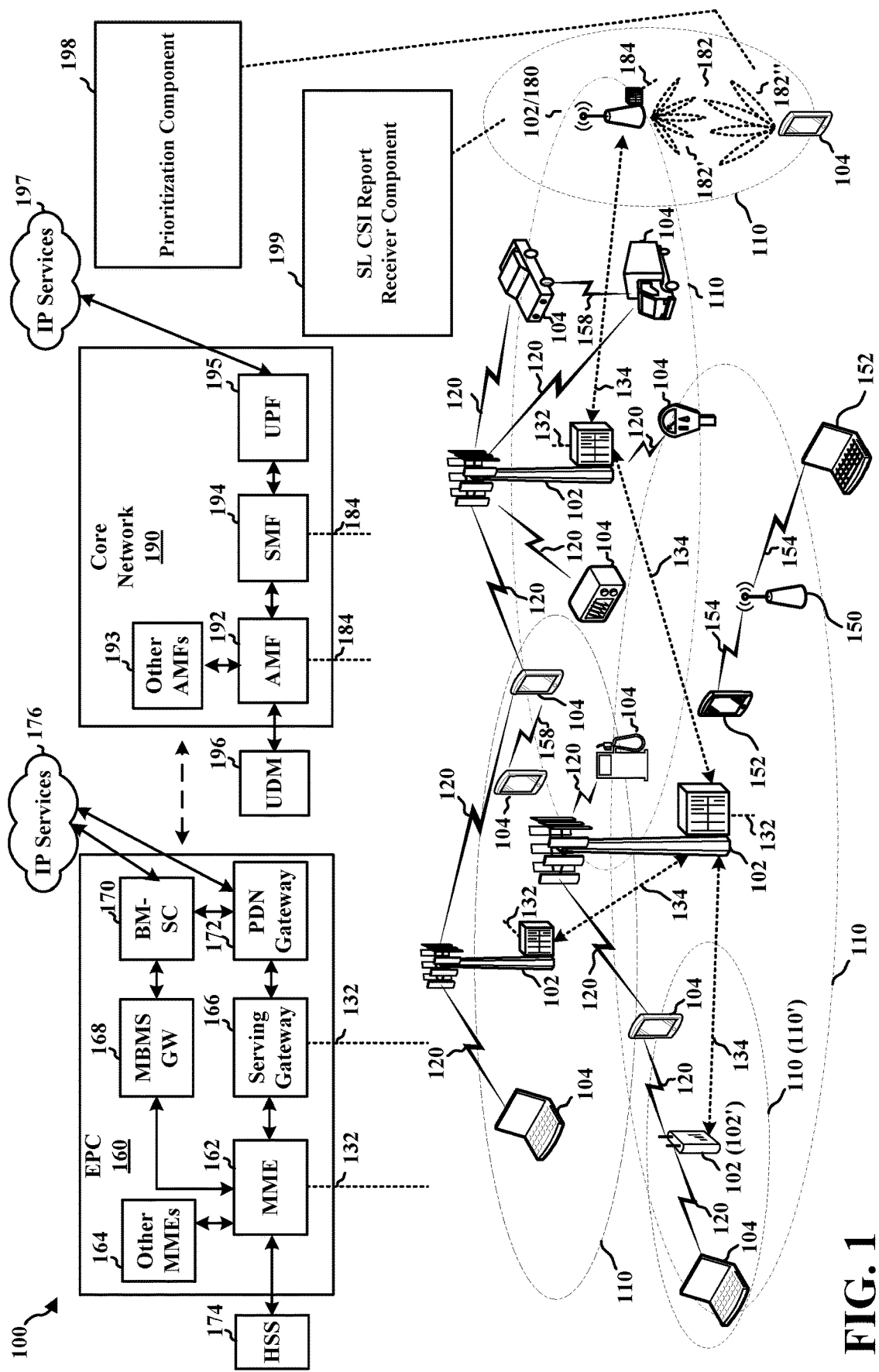
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, user equipment (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a prioritization component 198 configured to determine a sidelink (SL) channel state information (CSI) report corresponding to one or more SL transmissions between the UE and at least one other UE; determine a priority of the SL CSI report on an UL channel in association with a priority of one or more of at least one UL transmission or at least one other SL transmission; and transmit, to a base station via the uplink channel, the SL CSI report based on the priority of the SL CSI report on the UL channel in association with the priority of the one or more of the at least one UL transmission or the at least one other SL transmission. In certain aspects, the base station 180 may include a SL CSI report receiver component 199 configured to determine a priority of a SL CSI report corresponding to one or more SL transmissions between a UE and at least one other UE, the priority of the SL CSI report determined for an UL channel in association with a priority of one or more of at least one UL transmission or at least one other SL transmission; and receive, from the UE on the uplink channel, the SL CSI report based on the priority of the SL CSI report on the UL channel being determined in association with the priority of the one or more of the at least one UL transmission or the at least one other SL transmission. Although the following description may be focused on 5G NR, the concepts described herein may be applicable to other similar areas, such as LTE, LTE-A, CDMA, GSM, and other wireless technologies.

Figure 2:
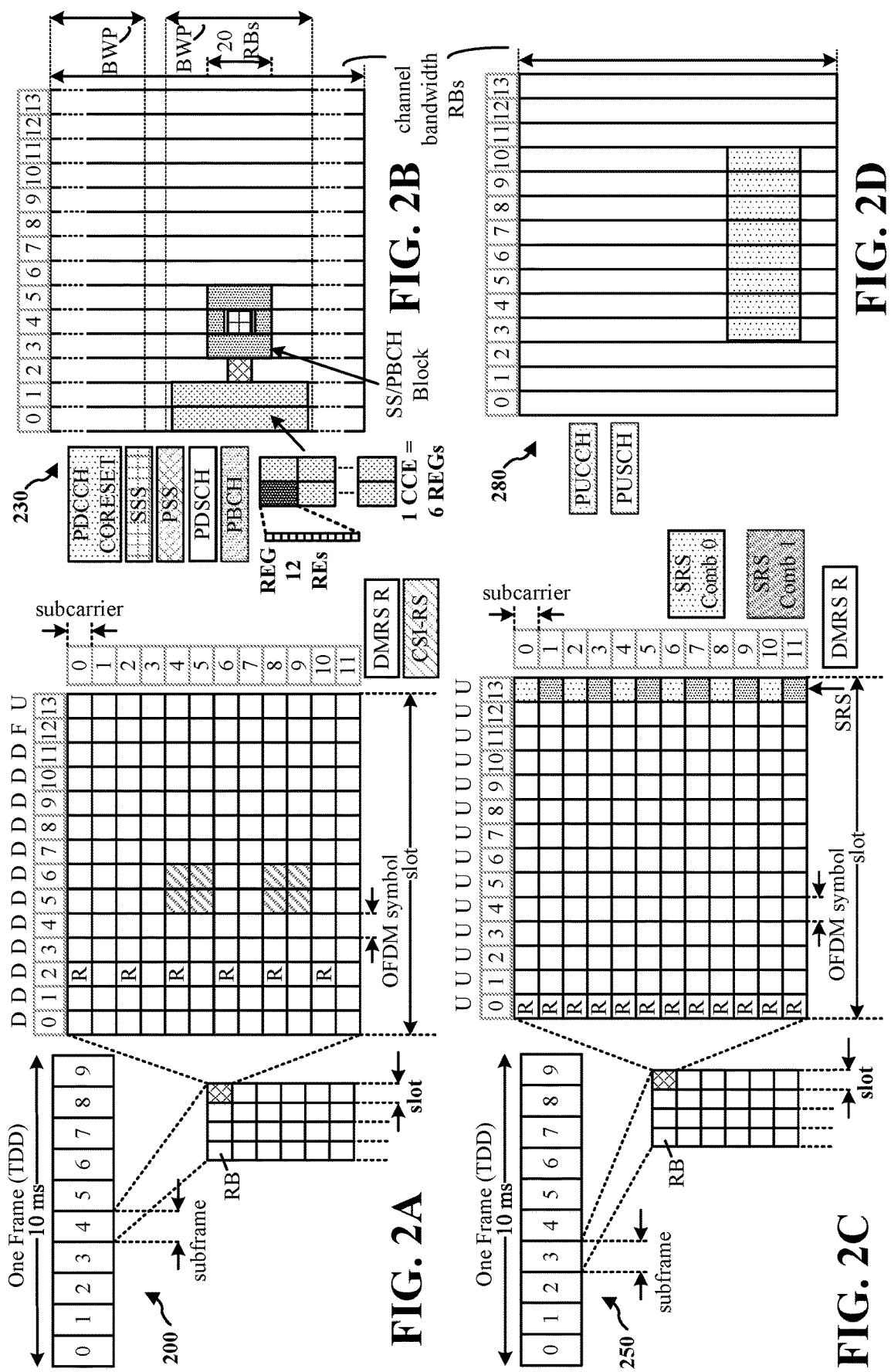
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$t=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
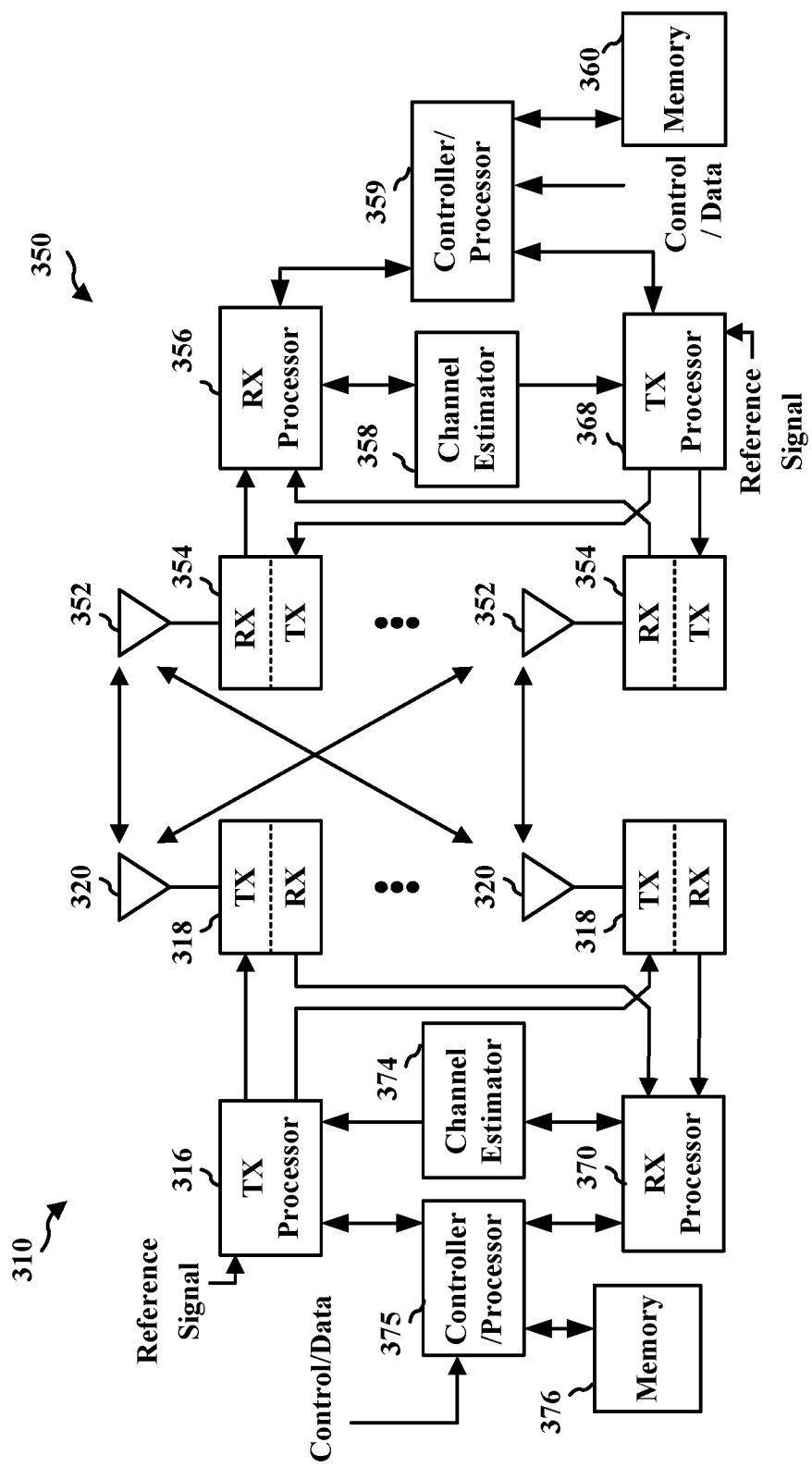
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the prioritization component 198 of FIG. 1.

At least one of the TX processor 316, the RX processor 370, and the controller/processor 375 may be configured to perform aspects in connection with the SL CSI report receiver component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc., that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
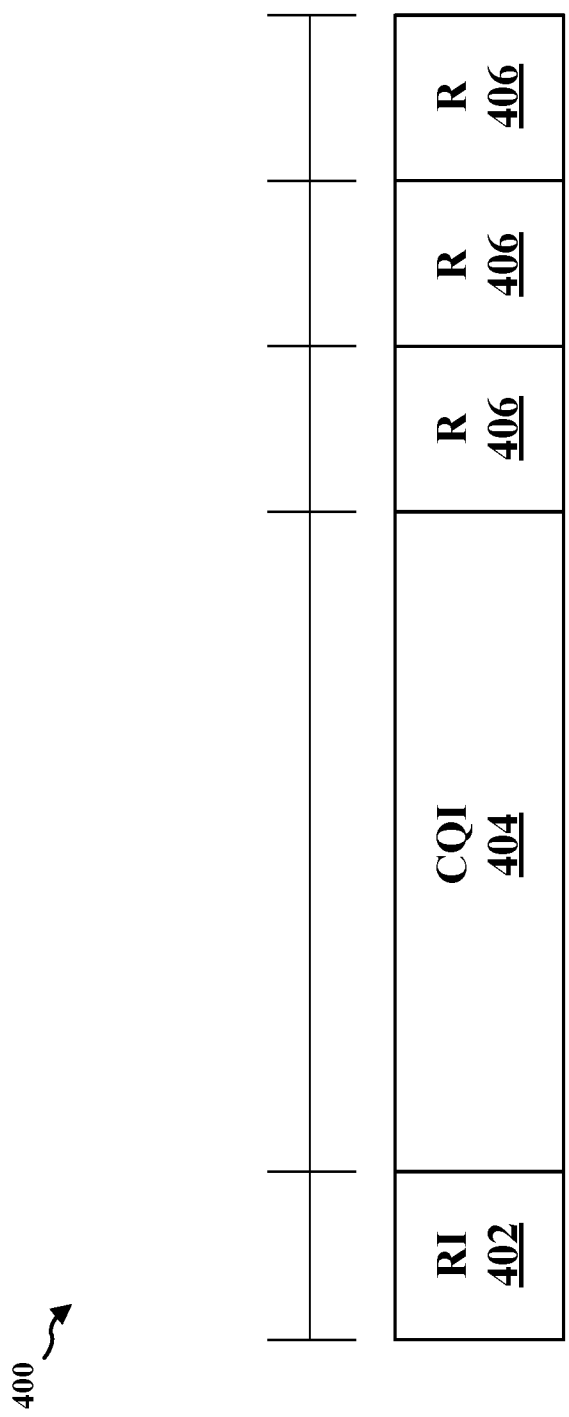
FIG. 4 illustrates a diagram of a channel state information (CSI) reporting format.

FIG. 4 illustrates a diagram 400 of a CSI reporting format. A UE may be configured to report/relay sidelink CSI to a base station, where the sidelink CSI may be indicative of channel conditions between the UE and another UE. For example, sidelink CSI may be reported to the base station for NR applications, vehicle-to-everything (V2X) applications, etc. In some examples, a first UE may transmit a sidelink CSI-RS to a second UE based on a unicast PSSCH, and the second UE may feedback a sidelink CSI report to the first UE, which may forward the CSI report to the base station.

Transmission of the sidelink CSI-RS may be triggered when CSI reporting is enabled at the first UE based on a higher layer parameter (e.g., sl-CSI-Acquisition), and based on a CSI request field for SCI format 2A being set to 1. The second UE may measure the CSI-RS, generate a CSI report for the first UE (e.g., indicative of CQI 404 and RI 402), and transmit the CSI report to the first UE via a MAC-CE. The CSI report may be forwarded from the first UE to the base station over a Uu link. In other cases, the first UE may refrain from forwarding the CSI report to the base station. For example, highly mobile devices, such as devices used for V2X applications, may be associated with a channel that varies too fast for the base station to perform scheduling determinations for sidelink communications after the CSI report is received from the first UE. The first UE may also refrain from forwarding the CSI report to the base station in cases where interference may be difficult to predict/report, such as mode 2 configurations based on distributed resource allocations (e.g., where sidelink UEs perform scheduling determinations based on sensing and reservations by the sidelink UEs).

Sidelink CSI reporting may be performed via a MAC-CE, which may be indicated based on a MAC subheader including a logical channel identifier (LCID). A priority of the sidelink CSI reporting via a MAC-CE may be fixed at a value of 1, where 1 may indicate a high priority and larger values may indicate lower priorities. The sidelink CSI reporting via a MAC-CE may include a RI 402 that indicates a rank for the sidelink CSI reporting. In the diagram 400, a length of the RI 402 corresponds to 1 bit. The sidelink CSI reporting may further include CQI 404 that indicates a CQI value of the sidelink CSI reporting. In the diagram 400, a length of the CQI 404 is 4 bits. The diagram 400 further includes 3 reserved bits 406, which may be set to 0.

Figure 5:
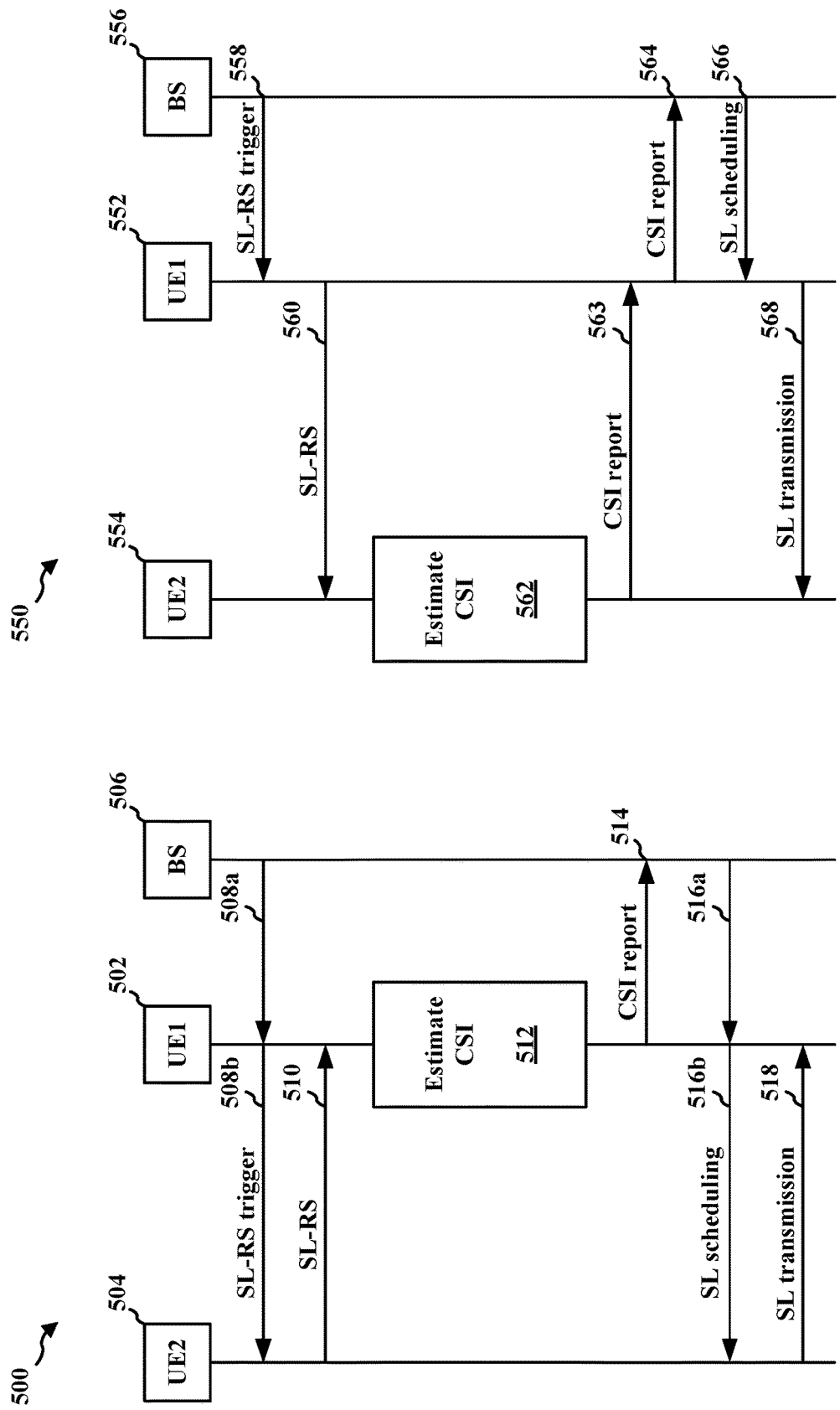
FIG. 5 illustrates call flow diagrams for CSI reporting to a base station.

FIG. 5 illustrates call flow diagrams 500-550 for CSI reporting to a base station. The diagrams 500-550 may correspond to CSI reporting in mode 1, which may be based on centralized resource allocations. For example, the base station may perform sidelink scheduling via grants transmitted to sidelink UEs that utilize the grants for transmitting sidelink communications.

The diagram 500 includes an aperiodic SL-RS transmission, at 510, for estimating, at 512, sidelink CSI at the first UE 502/relay UE. The first UE 502 may transmit, at 508b, an SL-RS trigger to the second UE 504. The SL-RS trigger may be initiated by the first UE 502 or by the base station 506 via an indication, at 508a, to the first UE 502. The first UE 502 may be a UE, such as a cell phone, smartphone, etc., of increased capability over the second UE 504, such as a smart watch, extended reality (XR) glasses, etc. The second UE 504 may transmit, at 510, the SL-RS to the first UE 502 based on receiving, at 508b, the SL-RS trigger from the first UE 502, such that CSI may be estimated, at 512, at the first UE 502 to determine channel conditions between the first UE 502 and the second UE 504. The first UE 502 may transmit, at 514, a CSI report to the base station 506 (e.g., as opposed to transmitting the CSI report to the second UE 504), for the base station 506 to perform sidelink scheduling determinations. The base station 506 may transmit, at 516a, a sidelink grant to the first UE 502 for scheduling a sidelink communication. The sidelink grant may allocate resources for sidelink communications between the first UE 502 and the second UE 504. At 516b, the first UE 502 may indicate the sidelink scheduling to the second UE 504. The second UE 504 may transmit, at 518, the sidelink communication to the first UE 502 based on resources scheduled by the base station 506.

The diagram 550 includes an aperiodic SL-RS transmission, at 560, for estimating, at 562, sidelink CSI at the second UE 554/remote UE. The first UE 552 may determine to trigger the SL-RS transmission, at 560, to the second UE 554 based on protocols of the first UE 552, or the first UE 552 may determine to trigger the SL-RS transmission, at 560, to the second UE 554 based on a SL-RS trigger received, at 558, from the base station 556. The SL-RS may be transmitted, at 560, from the first UE 552 to the second UE 554 based on the SL-RS trigger. The CSI may be estimated, at 562, at the second UE 554 based on the SL-RS to determine channel conditions between the first UE 552 and the second UE 554. The first UE 552 may be a UE, such as a cell phone, smartphone, etc., of increased capability over the second UE 554, such as a smart watch, XR glasses, etc. The second UE 554 may transmit, at 563, a CSI report to the first UE 552 indicative of the channel estimation performed at the second UE 554. The first UE 552 may transmit/relay, at 564, the CSI report received, at 563, from the second UE 554 to the base station 556. Based on the CSI report, the base station 556 may transmit, at 566, sidelink scheduling to the first UE 552. At 568, the first UE 552 may transmit a sidelink communication to the second UE 554 based on resources scheduled by the base station 556.

In the diagrams 500-550, the first UE 502/552 may transmit, at 514/564, the CSI report indicative of the sidelink channel conditions between the first UE 502/552 and the second UE 504/554 to the base station 506/556 via a PUCCH or a PUSCH. As the first UE 502/552 may correspond to the more-capable UE, the CSI report may be transmitted, at 514/564, to the base station 506/556 by the first UE 502/552 in both of the diagrams 500-550. The CSI report may be transmitted, at 514/564, over a Uu link, which may be associated with either a PUCCH or a PUSCH. However, if the CSI report on PUCCH/PUSCH collides with another communication of the same UE, one of the transmissions may have to be dropped.

Figure 6:
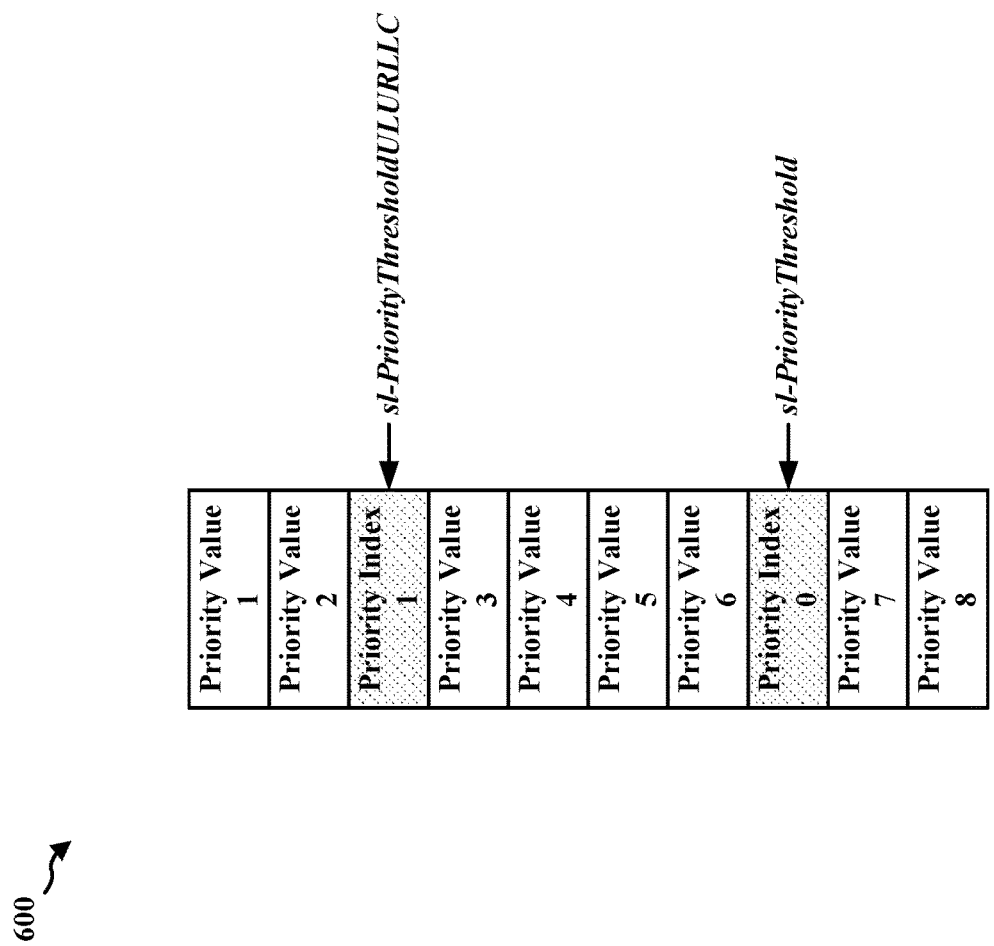
FIG. 6 illustrates a diagram of a prioritization order for sidelink (SL) and UL communications.

FIG. 6 illustrates a diagram 600 of a prioritization order for sidelink and uplink communications. The UE may perform a prioritization procedure when transmitting the CSI report results in a collision with another transmission. That is, if the UE is not configured to both transmit the CSI report and communicate via the other transmission, the UE may determine which transmission to drop and which transmission to maintain. For example, the UE may not be configured for full duplex (FD) communication, and may have to prioritize between transmitting and receiving. The channel that is determined to have the higher priority by comparison may correspond to the transmission that is maintained, and the channel that is determined to have the lower priority by comparison may correspond to the transmission that is dropped.

A priority value from 1 to 8 may be assigned to each PSCCH, PSSCH, and physical sidelink feedback channel (PSFCH) transmission/reception based on a predetermined protocol, where priority value 1 may correspond to the highest priority and priority value 8 may correspond to the lowest priority, as indicated in the diagram 600. The priority of the PSCCH/PSSCH/PSFCH may be determined based on the data included in the logical channel. A priority of a sidelink-SS/PSBCH block transmission/reception may be determined based on sl-SSB-PriorityNR, which may indicate a fixed priority level via RRC. Accordingly, prioritization for sidelink transmissions/receptions may be performed based on the determined sidelink priority value. For instance, if a sidelink transmission having a priority value of 1 collides with a sidelink reception having a priority value of 5, the communication associated with priority value 1 may be prioritized/transmitted, and the communication associated with priority value 5 may be dropped.

Each uplink transmission over the Uu link may be associated with a priority index 0 or 1, where priority index 1 may correspond to a high priority and priority index 0 may correspond to a low priority, as indicated in the diagram 600. Thus, the priority scale for communications over the Uu link is different from the priority scale for communications over sidelink. In order to prioritize between a sidelink transmission and an uplink transmission, the UE may have to compare the sidelink priority value to the uplink priority index. In examples, sidelink HARQ-ACK on a PUCCH may be assigned a same priority as a corresponding sidelink HARQ-ACK on a PSFCH.

The base station may configure the UE via RRC parameters, such as sl-PriorityThresholdULURLLC and sl-PriorityThreshold. For example, the UE may be configured with one or two priority thresholds for the UE to determine the prioritization between sidelink transmissions and uplink transmissions. For instance, a first threshold may be configured between sidelink priority values 2-3 and a second threshold may be configured between priority values 6-7. Hence, a sidelink transmission associated with a priority value smaller than the first threshold (e.g., sl-PriorityThresholdULURLLC) may have a higher priority than an uplink transmission associated with priority index 1 (e.g., URLLC transmission). A sidelink transmission associated with a priority value between the first threshold (e.g., sl-PriorityThresholdULURLLC) and the second threshold (sl-PriorityThreshold) may have a priority that is lower than the uplink transmission associated with priority index 1 (e.g., URLLC transmission), but higher than an uplink transmission associated with priority index 0 (e.g., eMBB transmission). A sidelink transmission associated with a priority value smaller than the second threshold (e.g., sl-PriorityThreshold) may have a priority that is lower than the uplink transmission associated with priority index 0 (e.g., eMBB transmission). A physical random access channel (PRACH) transmission, or a PUSCH transmission scheduled via uplink grant in a random access response (RAR) transmission or retransmission, or a PUSCH for a Type 2 random access procedure and associated retransmission may have a higher priority than a sidelink transmission/reception associated with priority value 1.

In a first aspect, the UE may perform prioritization between sidelink CSI on a PUCCH and other uplink or sidelink transmissions/receptions based on the priority associated with the sidelink CSI on the PUCCH and the priority of the uplink or sidelink transmissions/receptions. For example, if a priority level of the sidelink CSI on a PUCCH is determined by the UE, the priority level may be used to perform prioritization between the sidelink CSI on the PUCCH and the other uplink or sidelink transmissions/receptions. Prioritization may include dropping the channel(s) that are determined to have a lower priority.

Prioritization may be performed by the UE in association with different types of channels. In a first example, the UE may perform prioritization between sidelink CSI on a PUCCH and UCI on a PUCCH, or a PUSCH (e.g., with or without UCI). In a second example, the UE may perform prioritization between sidelink CSI on a PUCCH and a PRACH, or a PUSCH transmission during a RACH procedure. In a third example, the UE may perform prioritization between sidelink CSI on a PUCCH and a sidelink transmission including a PSCCH and a PSSCH, or a PSFCH. In a fourth example, the UE may perform prioritization between sidelink CSI on a PUCCH and a sidelink reception including a PSFCH reception, or a sidelink-SS/PSBCH block reception. In a fifth example, the UE may perform prioritization between sidelink CSI on a PUCCH and sidelink HARQ-ACK on a PUCCH.

In a second aspect, the priority for the sidelink CSI on a PUCCH may be determined based on a number of techniques. For instance, the sidelink CSI on a PUCCH may correspond to a fixed priority level. The priority of the sidelink CSI on a PUCCH may be the same as the sidelink CSI via a MAC-CE, where the priority level is equal to 1 (e.g., the highest priority for sidelink transmissions). The sidelink CSI on the PUCCH may be prioritized over other PSSCH or PSFCH transmissions/receptions. The priority of the sidelink CSI on the PUCCH may be alternatively based on the priority of the sidelink data communicated between two sidelink UEs. For example, the UE that transmits the sidelink CSI request may also indicate the priority level of the sidelink CSI. If the second UE/relay UE transmits the SL-RS, the second UE/relay UE may indicate the priority level of the data in the sidelink grant. The sidelink CSI may have the same priority as the sidelink data transmission. Thus, when the UE transmits the CSI report to the base station, the priority level of the CSI on the PUCCH, when compared to other channels, may be the same priority level as indicated for the sidelink data. For instance, the sidelink CSI may have the same priority as the PSSCH that is scheduled by the CSI grant used to trigger the sidelink CSI. In an alternative configuration, the base station may configure/indicate the priority of the sidelink CSI on the PUCCH to the sidelink UE. For example, the priority of the sidelink CSI on PUCCH may be indicated to the sidelink UE via RRC configuration.

Figure 7:
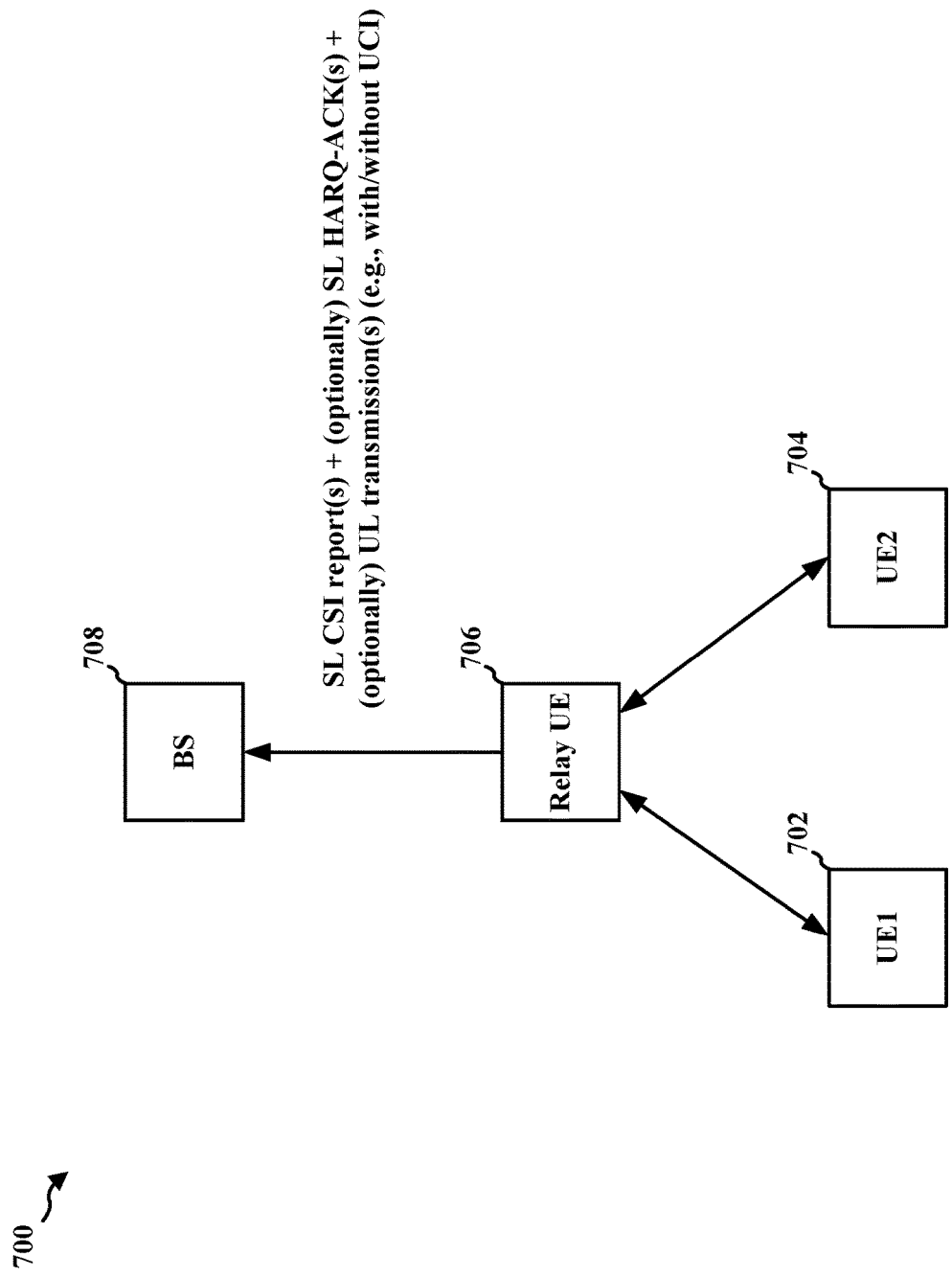
FIG. 7 illustrates a diagram indicative of a SL CSI report that is multiplexed with one or more other transmissions.

FIG. 7 illustrates a diagram 700 indicative of a sidelink CSI report that is multiplexed with one or more other transmissions. That is, a relay UE 706 may be configured to multiplex different sidelink communications on a PUCCH. For instance, the relay UE 706 may multiplex CSI reports received for different sidelink communication links and transmit the CSI reports to the base station 708 in a same PUCCH/PUSCH transmission. The relay UE 706 may receive a first CSI report from a first UE 702 (e.g., XR glasses) and a second CSI report from a second UE 704 (e.g., a smart watch) and multiplex the CSI reports. A link over a sidelink channel may be unidirectional. In other words, the first CSI report for a first link from the first UE 702 to the second UE 704 may be different from the second CSI report for a second link from the second UE 704 to the first UE 702. In the diagram 700, the CSI reports may also include a third CSI report for the link from the first UE 702 to the relay UE 706 and a fourth CSI report for the link from second UE 704 to the relay UE 706. The relay UE 706 may then multiplex the two CSI reports and transmit the CSI reports to the base station 708.

In further configurations, the relay UE 706 may multiplex one or more sidelink CSI reports and one or more sidelink HARQ-ACKs in a same PUCCH/PUSCH transmitted to the base station 708. Following a sidelink communication, the first UE 702 and the second UE 704 may feedback HARQ-ACKs for the corresponding transmission to the relay UE 706, which may multiplex the CSI reports and the HARQ-ACK feedback in a same transmission to the base station 708. If the transmission includes multiple CSI reports or a CSI report/HARQ-ACK feedback, the priority of the transmission may be determined based on the highest priority among the one or more sidelink CSI reports or the one or more sidelink HARQ-ACK transmissions. For example, if a first sidelink CSI transmission corresponds to priority level 2 and a second sidelink CSI transmission corresponds to priority level 5, the multiplexed transmission may be communicated based on priority level 2, which corresponds to the highest priority level associated with the communicated information. The multiplexed transmission may be transmitted on a PUCCH allocated for sidelink HARQ-ACK feedback or a PUCCH allocated for sidelink CSI transmission.

Rather than dropping the transmission associated with the lowest priority, the relay UE 706 may multiplex the sidelink CSI reports with other uplink transmissions. For instance, the relay UE 706 may multiplex a sidelink CSI report on a PUCCH that collides with a PUSCH (e.g., with or without UCI). That is, the relay UE 706 may be able to transmit both the PUSCH and the sidelink CSI report to the base station 708. The PUSCH may be rate-matched around the sidelink CSI report. The sidelink CSI reports may be either jointly encoded or separately encoded with UCI on the PUSCH or PUCCH. The relay UE 706 may also multiplex the sidelink CSI report with other UCI on a PUCCH, where a mapping order of the sidelink CSI report and the UCI may be based on the determined priorities. The relay UE 706 may first map the payload associated with the highest priority to the PUCCH, and subsequently map other payloads to the PUCCH based on priority levels. If there are not enough available resources to carry multiple transmissions, lower priority transmissions may be dropped.

Figure 8:
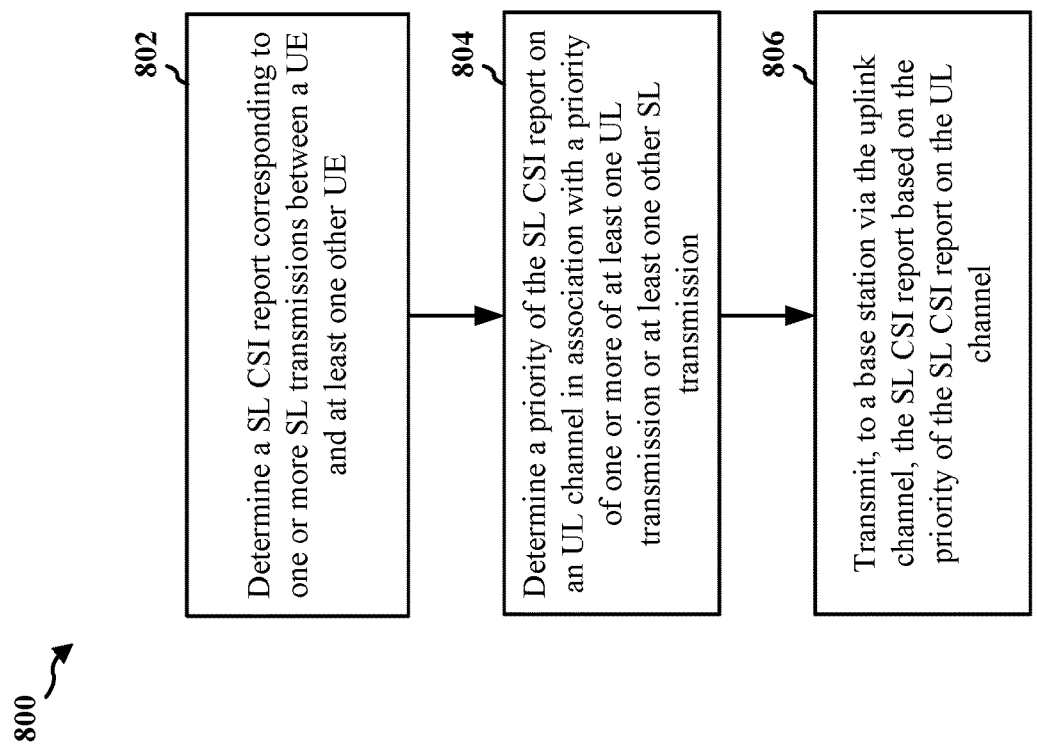
FIG. 8 is a flowchart of a method of wireless communication at a UE.

FIG. 8 is a flowchart 800 of a method of wireless communication. The method may be performed by a UE (e.g., the UE 104, 502, 552, 706; the apparatus 1202; etc.), which may include the memory 360 and which may be the entire UE 104, 502, 552, 706 or a component of the UE 104, 502, 552, 706, such as the TX processor 368, the RX processor 356, and/or the controller/processor 359.

At 802, the UE may determine a SL CSI report corresponding to one or more SL transmissions between a UE and at least one other UE. For example, referring to FIG. 5, the first UE 502 may determine the CSI report corresponding to the SL-RS received, at 510, from the second UE 504 based on the SL-RS trigger transmitted, at 508b, to the second UE 504. The first UE 552 may determine the CSI report corresponding to the SL-RS transmitted, at 560, to the second UE 554. The determination, at 802, may be performed by the determination component 1244 of the apparatus 1202 in FIG. 12.

At 804, the UE may determine a priority of the SL CSI report on an UL channel in association with a priority of one or more of at least one UL transmission or at least one other SL transmission. For example, referring to FIGS. 5-6, the UE 502/552 may determine a priority of the CSI report based on the diagram 600 indicative of the prioritization order for sidelink communications and uplink communications. The determination, at 804, may be performed by the determination component 1244 of the apparatus 1202 in FIG. 12.

At 806, the UE may transmit, to a base station via the uplink channel, the SL CSI report based on the priority of the SL CSI report on the UL channel. For example, referring to FIGS. 5-7, the first UE 502 may transmit, at 514, the CSI report to the base station 506 based on a priority determined via the diagram 600. The first UE 552 may transmit, at 564, the CSI report to the base station 556 based on a priority determined via the diagram 600. The relay UE 706 may transmit the CSI report to the base station 708 based on a priority determined via the diagram 600. The transmission, at 806, may be performed by the transmission component 1234 of the apparatus 1202 in FIG. 12.

Figure 9:
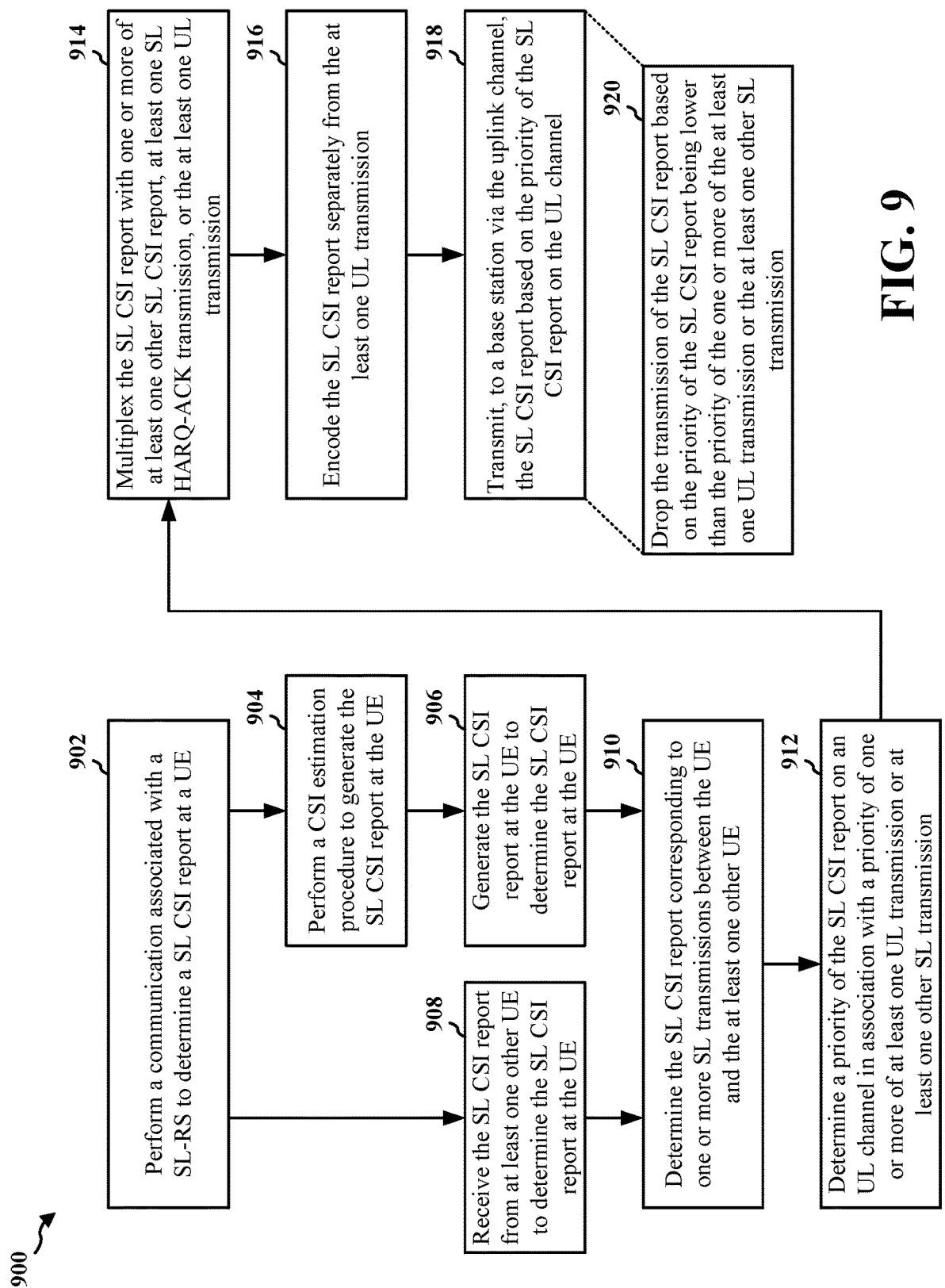
FIG. 9 is a flowchart of a method of wireless communication at a UE.

FIG. 9 is a flowchart 900 of a method of wireless communication. The method may be performed by a UE (e.g., the UE 104, 502, 552, 706; the apparatus 1202; etc.), which may include the memory 360 and which may be the entire UE 104, 502, 552, 706 or a component of the UE 104, 502, 552, 706, such as the TX processor 368, the RX processor 356, and/or the controller/processor 359.

At 902, the UE may perform a communication associated with a SL-RS to determine a SL CSI report at a UE. For example, referring to FIG. 5, the first UE 502 may transmit, at 508b, a SL-RS trigger to the second UE 504 for receiving a SL-RS from the second UE 504, and determining a CSI report based on estimating CSI, at 512. The first UE 552 may transmit, at 560, a SL-RS to the second UE 554 to determine a CSI report based on receiving, at 563, the CSI report from the second UE 554. The performance, at 902, may be performed by the performance component 1240 of the apparatus 1202 in FIG. 12.

At 904, the UE may perform a CSI estimation procedure to generate the SL CSI report at the UE. For example, referring to FIG. 5, the first UE 502 may estimate CSI, at 512, for determining the CSI report at the first UE 502. The performance, at 904, may be performed by the performance component 1240 of the apparatus 1202 in FIG. 12.

At 906, the UE may generate the SL CSI report at the UE to determine the SL CSI report at the UE. For example, referring to FIG. 5, the first UE 502 may generate the CSI report based on the CSI estimated, at 512, to determine the CSI report at the first UE 502. The generation, at 906, may be performed by the generation component 1242 of the apparatus 1202 in FIG. 12.

At 908, the UE may alternatively receive the SL CSI report from at least one other UE to determine the SL CSI report at the UE. For example, referring to FIG. 5, the first UE 552 may receive, at 563, the CSI report from the second UE 554 to determine the CSI report at the first UE 552. The reception, at 908, may be performed by the reception component 1230 of the apparatus 1202 in FIG. 12.

At 910, the UE may determine the SL CSI report corresponding to one or more SL transmissions between the UE and the at least one other UE. For example, referring to FIG. 5, the first UE 502 may determine the CSI report corresponding to the SL-RS received, at 510, from the second UE 504 based on the SL-RS trigger transmitted, at 508b, to the second UE 504. The first UE 552 may determine the CSI report corresponding to the SL-RS transmitted, at 560, to the second UE 554. The determination, at 910, may be performed by the determination component 1244 of the apparatus 1202 in FIG. 12.

At 912, the UE may determine a priority of the SL CSI report on an UL channel in association with a priority of one or more of at least one UL transmission or at least one other SL transmission. For example, referring to FIGS. 5-6, the UE 502/552 may determine a priority of the CSI report based on the diagram 600 indicative of the prioritization order for sidelink communications and uplink communications. The priority of the SL CSI report may correspond to a fixed priority level (e.g., indicated in the diagram 600) associated with the one or more SL transmissions between the UE (e.g., first UE 502/552) and the at least one other UE (e.g., second UE 504/554). The priority of the SL CSI report may be based on a priority level (e.g., associated with the diagram 600) of SL data communicated between the UE (e.g., first UE 502/552) and the at least one other UE (e.g., second UE 504/554). The determination, at 912, may be performed by the determination component 1244 of the apparatus 1202 in FIG. 12.

At 914, the UE may multiplex the SL CSI report with one or more of at least one other SL CSI report, at least one SL HARQ-ACK transmission, or the at least one UL transmission. For example, referring to FIG. 7, the relay UE 706 may multiplex the SL CSI report with another SL CSI report(s), SL HARK-ACK(s), and/or UL transmission(s) (e.g., with/without UCI). The multiplexing, at 914, may be performed by the multiplexer component 1246 of the apparatus 1202 in FIG. 12.

At 916, the UE may encode the SL CSI report separately from the at least one UL transmission. For example, referring to FIG. 5, the first UE 502 may transmit, at 514, the CSI report to the base station 506 based on a separate encoding from an UL transmission. The first UE 552 may transmit, at 564, the CSI report to the base station 556 based on a separate encoding from an UL transmission. The encoding, at 916, may be performed by the encoder component 1248 of the apparatus 1202 in FIG. 12.

At 918, the UE may transmit, to a base station via the uplink channel, the SL CSI report based on the priority of the SL CSI report on the UL channel. For example, referring to FIGS. 5-7, the first UE 502 may transmit, at 514, the CSI report to the base station 506 based on a priority determined via the diagram 600. The first UE 552 may transmit, at 564, the CSI report to the base station 556 based on a priority determined via the diagram 600. The relay UE 706 may transmit the CSI report to the base station 708 based on a priority determined via the diagram 600. The UL channel for transmitting, at 514/564, the SL CSI report may correspond to at least one of a PUSCH or a PUCCH. The transmission, at 918, may be performed by the transmission component 1234 of the apparatus 1202 in FIG. 12.

At 920, transmitting the SL CSI report based on the priority of the SL CSI report may correspond to the UE dropping the transmission of the SL CSI report based on the priority of the SL CSI report being lower than the priority of the one or more of the at least one UL transmission or the at least one other SL transmission. For example, referring to FIGS. 5-7, the first UE 502 may drop the CSI report based on a priority determined via the diagram 600. The first UE 552 may drop the CSI report based on a priority determined via the diagram 600. The relay UE 706 may drop the CSI report based on a priority determined via the diagram 600. The transmission drop, at 920, may be performed by the transmission component 1234 of the apparatus 1202 in FIG. 12.

Figure 10:
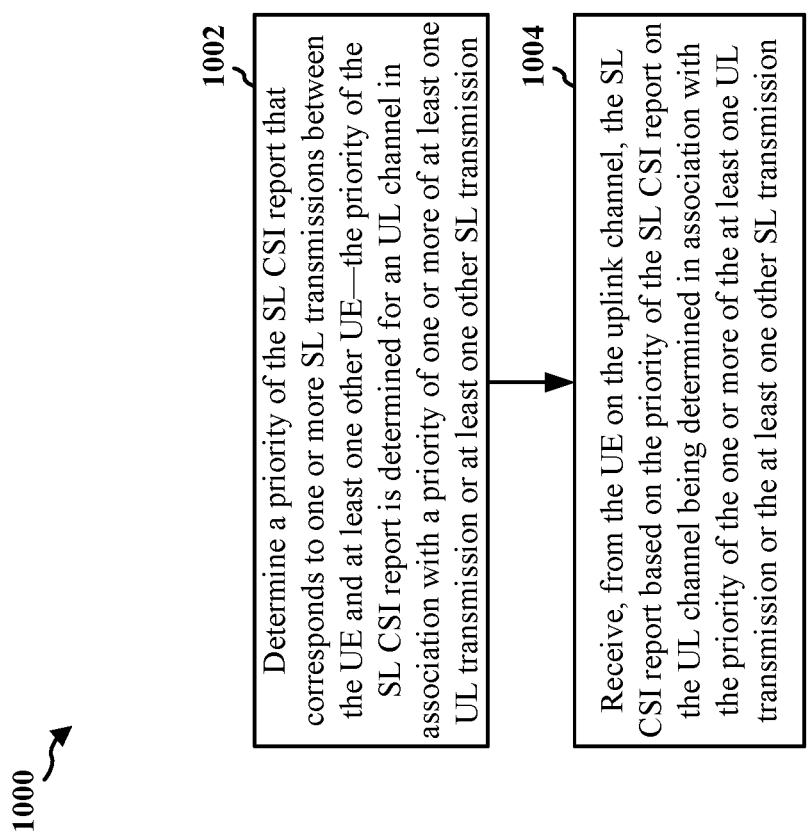
FIG. 10 is a flowchart of a method of wireless communication at a base station.

FIG. 10 is a flowchart 1000 of a method of wireless communication. The method may be performed by a base station (e.g., the base station 102, 506, 556, 708; the apparatus 1302; etc.), which may include the memory 376 and which may be the entire base station 102, 506, 556, 708 or a component of the base station 102, 506, 556, 708, such as the TX processor 316, the RX processor 370, and/or the controller/processor 375.

At 1002, the base station may determine a priority of the SL CSI report that corresponds to one or more SL transmissions between the UE and at least one other UE—the priority of the SL CSI report is determined for an UL channel in association with a priority of one or more of at least one UL transmission or at least one other SL transmission. For example, referring to FIGS. 5-6, the base station 506/556 may determine a priority of the CSI report based on the diagram 600 indicative of the prioritization order for sidelink communications and uplink communications. The CSI report may correspond to the SL-RS received, at 510, from the second UE 504 based on the SL-RS trigger transmitted, at 508b, from the first UE 502 to the second UE 504, or the CSI report may correspond to the SL-RS transmitted, at 560, from the first UE 552 to the second UE 554. The determination, at 1002, may be performed by the determination component 1340 of the apparatus 1302 in FIG. 13.

At 1004, the base station may receive, from the UE on the uplink channel, the SL CSI report based on the priority of the SL CSI report on the UL channel being determined in association with the priority of the one or more of the at least one UL transmission or the at least one other SL transmission. For example, referring to FIGS. 5-7, the base station 506 may receive, at 514, the CSI report from the first UE 502 based on a priority determined via the diagram 600. The base station 556 may receive, at 564, the CSI report from the first UE 552 based on a priority determined via the diagram 600. The base station 708 may receive the CSI report from the relay UE 706 based on a priority determined via the diagram 600. The reception, at 1004, may be performed by the reception component 1330 of the apparatus 1302 in FIG. 13.

Figure 11:
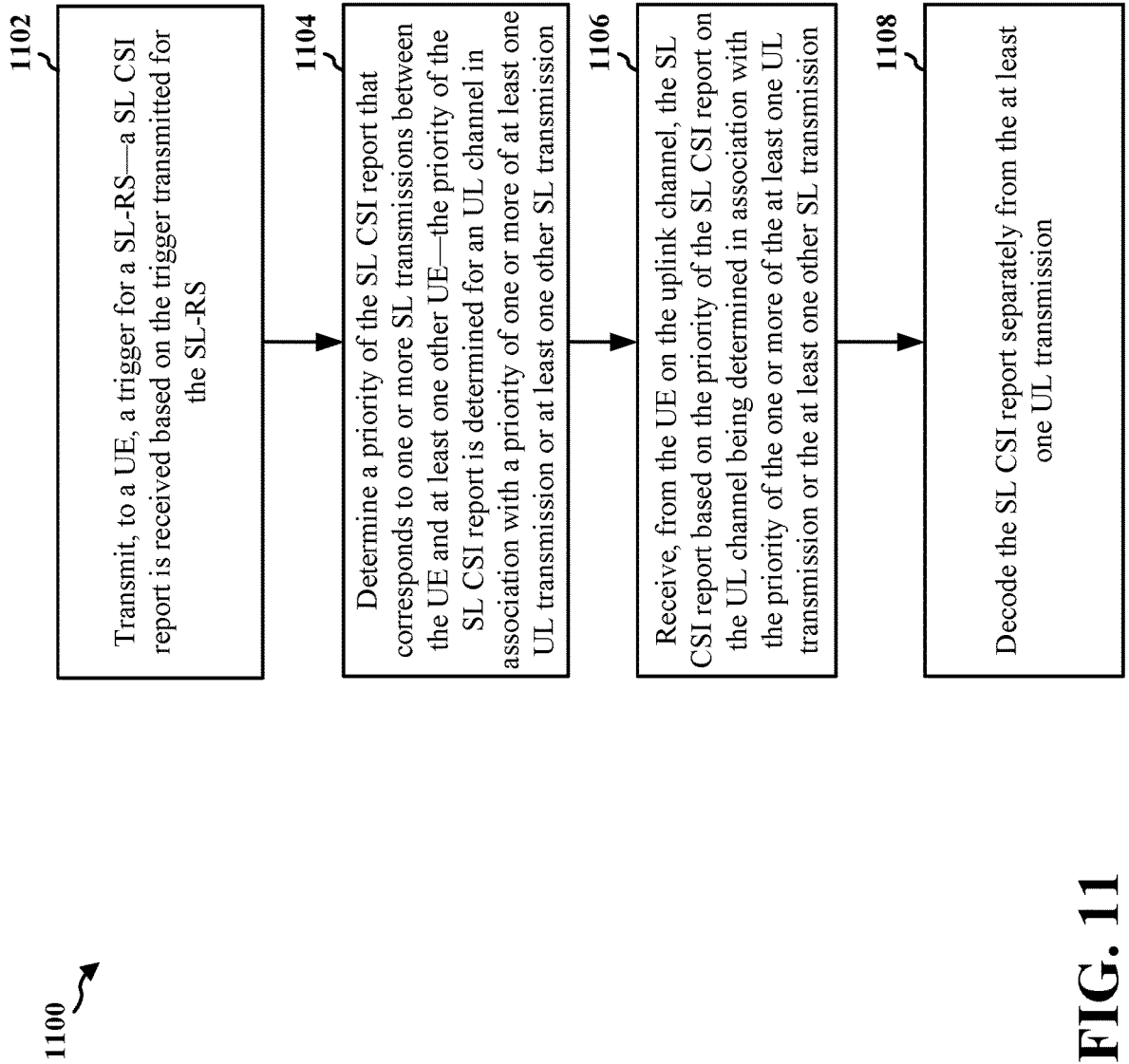
FIG. 11 is a flowchart of a method of wireless communication at a base station.

FIG. 11 is a flowchart 1100 of a method of wireless communication. The method may be performed by a base station (e.g., the base station 102, 506, 556, 708; the apparatus 1302; etc.), which may include the memory 376 and which may be the entire base station 102, 506, 556, 708 or a component of the base station 102, 506, 556, 708, such as the TX processor 316, the RX processor 370, and/or the controller/processor 375.

At 1102, the base station may transmit, to a UE, a trigger for a SL-RS—a SL CSI report is received based on the trigger transmitted for the SL-RS. For example, referring to FIG. 5, the base station 506 may transmit, at 508a, an SL-RS trigger to the first UE 502. A CSI report is received, at 514, by the base station 506 based on the SL-RS trigger transmitted, at 508a. The base station 556 may transmit, at 558, an SL-RS trigger to the first UE 552. A CSI report is received, at 564, by the base station 556 based on the SL-RS trigger transmitted, at 558. The transmission, at 1102, may be performed by the transmission component 1334 of the apparatus 1302 in FIG. 13.

At 1104, the base station may determine a priority of the SL CSI report that corresponds to one or more SL transmissions between the UE and at least one other UE—the priority of the SL CSI report is determined for an UL channel in association with a priority of one or more of at least one UL transmission or at least one other SL transmission. For example, referring to FIGS. 5-6, the base station 506/556 may determine a priority of the CSI report based on the diagram 600 indicative of the prioritization order for sidelink communications and uplink communications. The CSI report may correspond to the SL-RS received, at 510, from the second UE 504 based on the SL-RS trigger transmitted, at 508b, from the first UE 502 to the second UE 504, or the CSI report may correspond to the SL-RS transmitted, at 560, from the first UE 552 to the second UE 554. The priority of the SL CSI report may correspond to a fixed priority level (e.g., indicated in the diagram 600) associated with the one or more SL transmissions between the UE (e.g., first UE 502/552) and the at least one other UE (e.g., second UE 504/554). The priority of the SL CSI report may be based on a priority level (e.g., associated with the diagram 600) of SL data communicated between the UE (e.g., first UE 502/552) and the at least one other UE (e.g., second UE 504/554). The determination, at 1104, may be performed by the determination component 1340 of the apparatus 1302 in FIG. 13.

At 1106, the base station may receive, from the UE on the uplink channel, the SL CSI report based on the priority of the SL CSI report on the UL channel being determined in association with the priority of the one or more of the at least one UL transmission or the at least one other SL transmission. For example, referring to FIGS. 5-7, the base station 506 may receive, at 514, the CSI report from the first UE 502 based on a priority determined via the diagram 600. The base station 556 may receive, at 564, the CSI report from the first UE 552 based on a priority determined via the diagram 600. The base station 708 may receive the CSI report from the relay UE 706 based on a priority determined via the diagram 600. The SL CSI report may be received, at 514/564, from the at least one other UE (e.g., second UE 504/554) via the UE (e.g., first UE 502/552). The SL CSI report may be indicative of a CSI estimation performed, at 512, by the first UE 502 or, at 562, by the second UE 554. The SL CSI report received, at 514/564, by the base station 506/556 may be multiplexed (e.g., as illustrated in the diagram 700) with another SL CSI report(s), SL HARK-ACK(s), and/or UL transmission(s) (e.g., with/without UCI). The UL channel for receiving, at 514/564, the SL CSI report may correspond to at least one of a PUSCH or a PUCCH. Receiving the SL CSI report based on the priority of the SL CSI report may include the SL CSI report being dropped (e.g., based on the diagram 600) when the priority of the SL CSI report is lower than the priority of the one or more of the at least one UL transmission or the at least one other SL transmission. The reception, at 1106, may be performed by the reception component 1330 of the apparatus 1302 in FIG. 13.

At 1108, the base station may decode the SL CSI report separately from the at least one UL transmission. For example, referring to FIG. 5, the base station 506 may receive, at 514, the CSI report from the first UE 502 based on a separate encoding from an UL transmission. The base station 556 may receive, at 564, the CSI report from the first UE 552 based on a separate encoding from an UL transmission. The decoding, at 1108, may be performed by the decoder component 1342 of the apparatus 1302 in FIG. 13.

Figure 12:
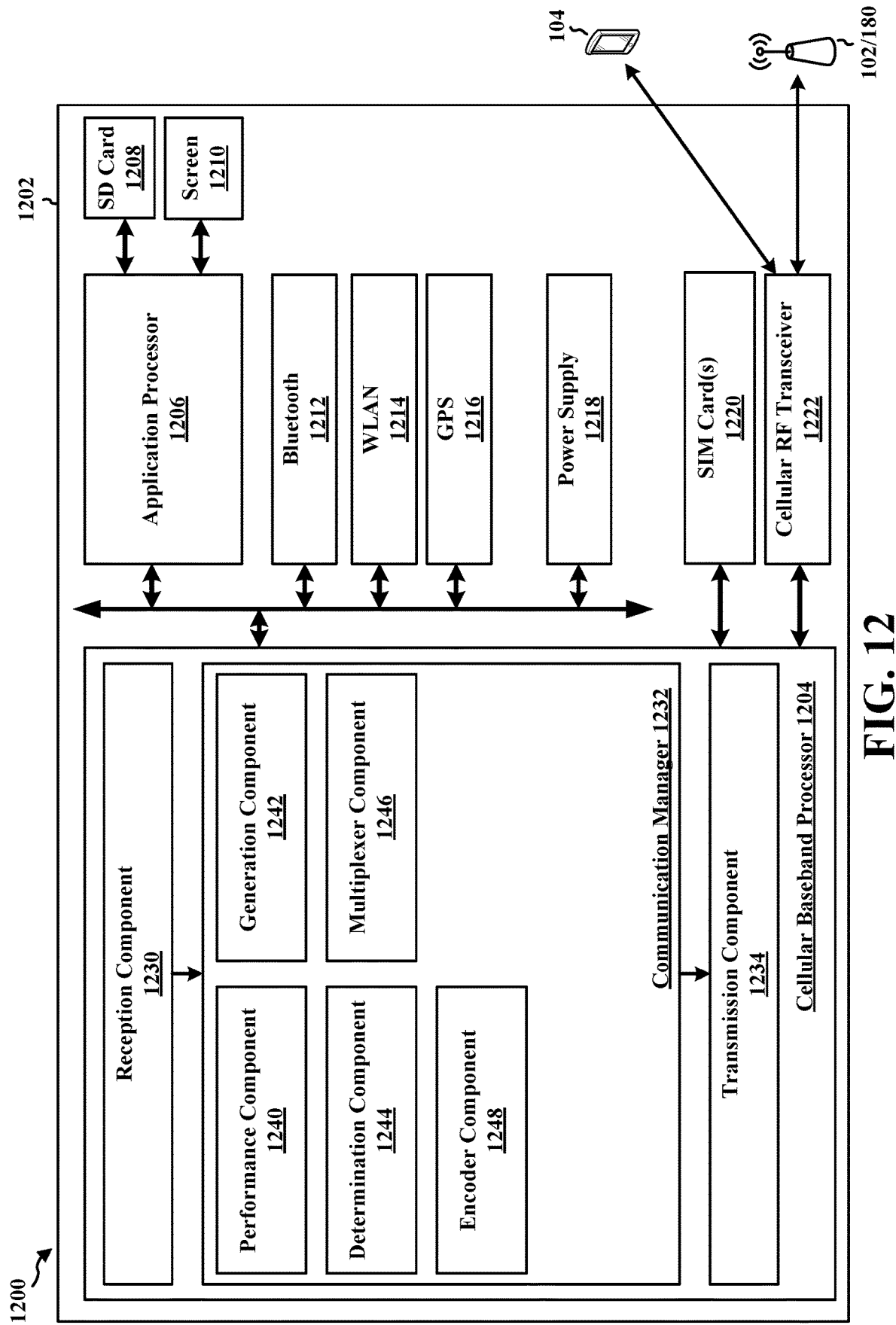
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a performance component 1240 that is configured, e.g., as described in connection with 902 and 904, to perform a communication associated with a SL-RS to determine a SL CSI report at a UE; and to perform a CSI estimation procedure to generate the SL CSI report at the UE. The communication manager 1232 further includes a generation component 1242 that is configured, e.g., as described in connection with 906, to generate the SL CSI report at the UE to determine the SL CSI report at the UE. The communication manager 1232 further includes a determination component 1244 that is configured, e.g., as described in connection with 802, 804, 910, and 912, to determine the SL CSI report corresponding to one or more SL transmissions between the UE and the at least one other UE; and to determine a priority of the SL CSI report on an UL channel in association with a priority of one or more of at least one UL transmission or at least one other SL transmission. The communication manager 1232 further includes a multiplexer component 1246 that is configured, e.g., as described in connection with 914, to multiplex the SL CSI report with one or more of at least one other SL CSI report, at least one SL HARQ-ACK transmission, or the at least one UL transmission. The communication manager 1232 further includes an encoder component 1248 that is configured, e.g., as described in connection with 916, to encode the SL CSI report separately from the at least one UL transmission.

The reception component 1230 is configured, e.g., as described in connection with 908, to receive the SL CSI report from at least one other UE to determine the SL CSI report at the UE. The transmission component 1234 is configured, e.g., as described in connection with 806, 918, and 920, to transmit, to a base station via the uplink channel, the SL CSI report based on the priority of the SL CSI report on the UL channel; and to drop the transmission of the SL CSI report based on the priority of the SL CSI report being lower than the priority of the one or more of the at least one UL transmission or the at least one other SL transmission.

The apparatus may include additional components that perform each of the blocks of the algorithm in the flowcharts of FIGS. 8-9. As such, each block in the flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for determining a SL CSI report corresponding to one or more SL transmissions between the UE and at least one other UE; means for determining a priority of the SL CSI report on an UL channel in association with a priority of one or more of at least one UL transmission or at least one other SL transmission; and means for transmitting, to a base station via the uplink channel, the SL CSI report based on the priority of the SL CSI report on the UL channel in association with the priority of the one or more of the at least one UL transmission or the at least one other SL transmission. The apparatus 1202 further includes means for receiving the SL CSI report from the at least one other UE, where the SL CSI report is determined based on receiving the SL CSI report from the at least one other UE. The apparatus 1202 further includes means for generating the SL CSI report at the UE, where the SL CSI report is determined based on generating the SL CSI report at the UE. The apparatus 1202 further includes means for performing a CSI estimation procedure to generate the SL CSI report at the UE. The apparatus 1202 further includes means for performing a communication associated with a SL-RS, where the SL CSI report is determined based on the communication associated with the SL-RS.

The apparatus 1202 further includes means for multiplexing the SL CSI report with at least one other SL CSI report, where the transmission of the SL CSI report to the base station is based on the SL CSI report being multiplexed with the at least one other SL CSI report. The apparatus 1202 further includes means for multiplexing the SL CSI report with at least one SL HARQ-ACK transmission, where the transmission of the SL CSI report to the base station is based on the SL CSI report being multiplexed with the at least one HARQ-ACK transmission. The apparatus 1202 further includes means for multiplexing the SL CSI report with the at least one UL transmission, where the transmission of the SL CSI report to the base station is based on the SL CSI report being multiplexed with the at least one UL transmission. The apparatus 1202 further includes means for encoding the SL CSI report separately from the at least one UL transmission. The means for transmitting the SL CSI report based on the priority of the SL CSI report may be further configured to drop the transmission of the SL CSI report based on the priority of the SL CSI report being lower than the priority of the one or more of the at least one UL transmission or the at least one other SL transmission.

The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
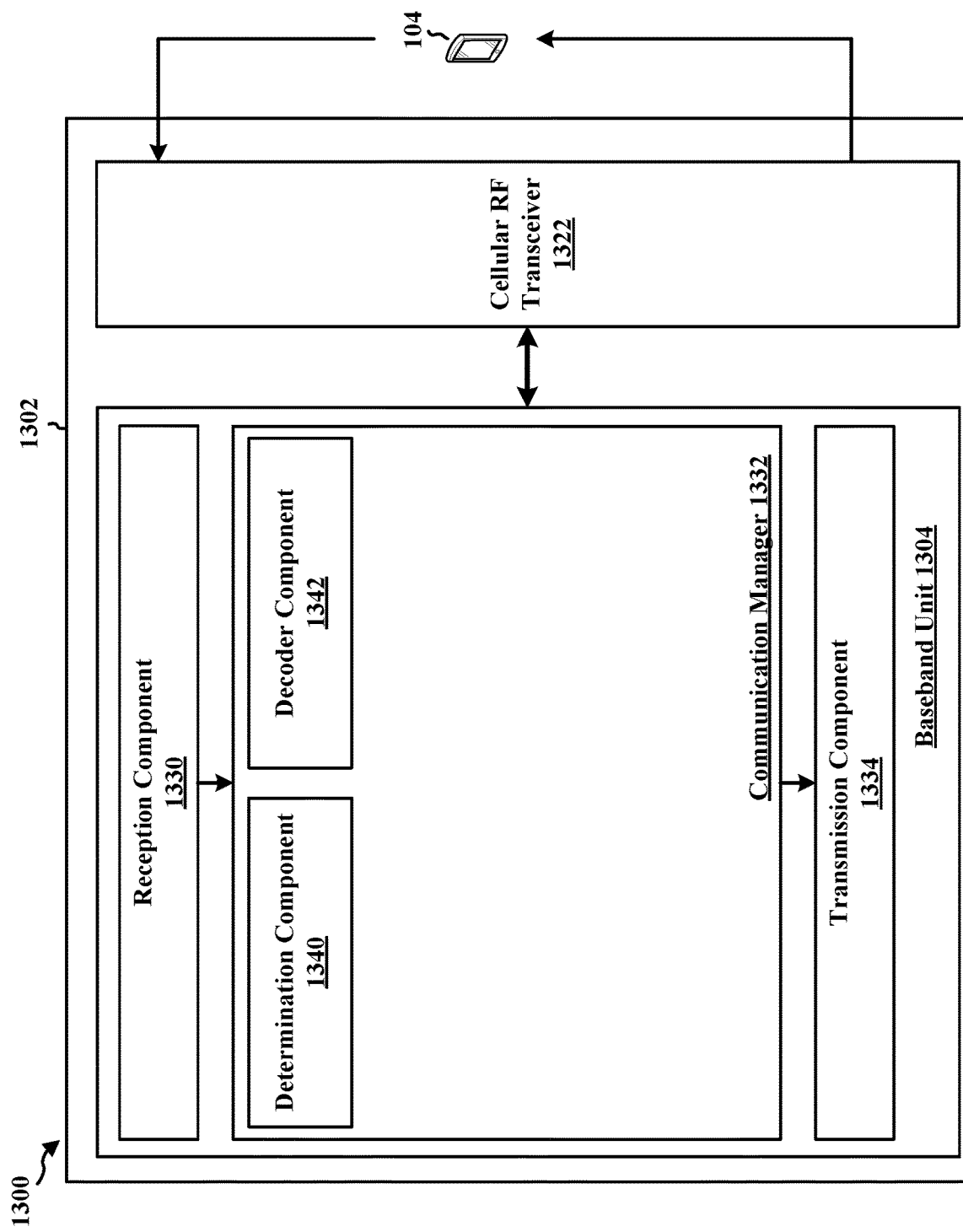
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1202 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a determination component 1340 that is configured, e.g., as described in connection with 1002 and 1104, to determine a priority of the SL CSI report that corresponds to one or more SL transmissions between the UE and at least one other UE— the priority of the SL CSI report is determined for an UL channel in association with a priority of one or more of at least one UL transmission or at least one other SL transmission. The communication manager 1332 further includes a decoder component 1342 that is configured, e.g., as described in connection with decode the SL CSI report separately from the at least one UL transmission.

The reception component 1330 is configured, e.g., as described in connection with 1004 and 1106, to receive, from the UE on the uplink channel, the SL CSI report based on the priority of the SL CSI report on the UL channel being determined in association with the priority of the one or more of the at least one UL transmission or the at least one other SL transmission. The transmission component 1334 is configured, e.g., as described in connection with 1102, to transmit, to a UE, a trigger for a SL-RS—a SL CSI report is received based on the trigger transmitted for the SL-RS.

The apparatus may include additional components that perform each of the blocks of the algorithm in the flowcharts of FIGS. 10-11. As such, each block in the flowcharts of FIGS. 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for determining a priority of a SL CSI report corresponding to one or more SL transmissions between a UE and at least one other UE, the priority of the SL CSI report determined for an UL channel in association with a priority of one or more of at least one UL transmission or at least one other SL transmission; and means for receiving, from the UE on the uplink channel, the SL CSI report based on the priority of the SL CSI report on the UL channel being determined in association with the priority of the one or more of the at least one UL transmission or the at least one other SL transmission. The apparatus 1302 further includes means for transmitting, to the UE, a trigger for a SL-RS, where the SL CSI report is received based on the trigger transmitted for the SL-RS. The apparatus 1302 further includes means for decoding the SL CSI report separately from the at least one UL transmission.

The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to determine a SL CSI report corresponding to one or more SL transmissions between the UE and at least one other UE; determine a priority of the SL CSI report on an UL channel in association with a priority of one or more of at least one UL transmission or at least one other SL transmission; and transmit, to a base station via the uplink channel, the SL CSI report based on the priority of the SL CSI report on the UL channel in association with the priority of the one or more of the at least one UL transmission or the at least one other SL transmission.

Aspect 2 may be combined with aspect 1 and includes that the at least one processor is further configured to receive the SL CSI report from the at least one other UE, where the SL CSI report is determined based on the reception of the SL CSI report from the at least one other UE.

Aspect 3 may be combined with aspect 1 and includes that the at least one processor is further configured to generate the SL CSI report at the UE, where the SL CSI report is determined based on the generation of the SL CSI report at the UE.

Aspect 4 may be combined with aspects 1 or 3 and includes that the at least one processor is further configured to perform a CSI estimation procedure to generate the SL CSI report at the UE.

Aspect 5 may be combined with any of aspects 1-4 and includes that the priority of the SL CSI report corresponds to a fixed priority level associated with the one or more SL transmissions between the UE and the at least one other UE.

Aspect 6 may be combined with any of aspects 1-5 and includes that the priority of the SL CSI report is based on a priority level of SL data communicated between the UE and the at least one other UE.

Aspect 7 may be combined with any of aspects 1-6 and includes that the at least one processor is further configured to perform a communication associated with a SL-RS, where the SL CSI report is determined based on the communication associated with the SL-RS.

Aspect 8 may be combined with any of aspects 1-7 and includes that the at least one processor is further configured to multiplex the SL CSI report with at least one other SL CSI report, where the transmission of the SL CSI report to the base station is based on the SL CSI report being multiplexed with the at least one other SL CSI report.

Aspect 9 may be combined with any of aspects 1-8 and includes that the at least one processor is further configured to multiplex the SL CSI report with at least one SL HARQ-ACK transmission, where the transmission of the SL CSI report to the base station is based on the SL CSI report being multiplexed with the at least one HARQ-ACK transmission.

Aspect 10 may be combined with any of aspects 1-9 and includes that the at least one processor is further configured to multiplex the SL CSI report with the at least one UL transmission, where the transmission of the SL CSI report to the base station is based on the SL CSI report being multiplexed with the at least one UL transmission.

Aspect 11 may be combined with any of aspects 1-10 and includes that the at least one UL transmission includes UCI.

Aspect 12 may be combined with any of aspects 1-11 and includes that the at least one processor is further configured to encode the SL CSI report separately from the at least one UL transmission.

Aspect 13 may be combined with any of aspects 1-12 and includes that the UL channel for transmission of the SL CSI report corresponds to at least one of a PUSCH or a PUCCH.

Aspect 14 may be combined with any of aspects 1-13 and includes that to transmit the SL CSI report based on the priority of the SL CSI report the at least one processor is further configured to drop the transmission of the SL CSI report based on the priority of the SL CSI report being lower than the priority of the one or more of the at least one UL transmission or the at least one other SL transmission.

Aspect 15 may be combined with any of aspects 1-14 and further includes a transceiver coupled to the at least one processor.

Aspect 16 is an apparatus for wireless communication at a base station including at least one processor coupled to a memory and configured to determine a priority of a SL CSI report corresponding to one or more SL transmissions between a user equipment (UE) and at least one other UE, the priority of the SL CSI report determined for an UL channel in association with a priority of one or more of at least one UL transmission or at least one other SL transmission; and receive, from the UE on the uplink channel, the SL CSI report based on the priority of the SL CSI report on the UL channel being determined in association with the priority of the one or more of the at least one UL transmission or the at least one other SL transmission.

Aspect 17 may be combined with aspect 16 and includes that the SL CSI report is received from the at least one other UE via the UE.

Aspect 18 may be combined with any of aspects 16-17 and includes that the SL CSI report is indicative of a CSI estimation performed at the UE or the at least one other UE.

Aspect 19 may be combined with any of aspects 16-18 and includes that the priority of the SL CSI report corresponds to a fixed priority level associated with the one or more SL transmissions between the UE and the at least one other UE.

Aspect 20 may be combined with any of aspects 16-19 and includes that the priority of the SL CSI report is based on a priority level of SL data communicated between the UE and the at least one other UE.

Aspect 21 may be combined with any of aspects 16-20 and includes that the at least one processor is further configured to transmit, to the UE, a trigger for a SL-RS, where the SL CSI report is received based on the trigger transmitted for the SL-RS.

Aspect 22 may be combined with any of aspects 16-21 and includes that the SL CSI report is multiplexed with at least one other SL CSI report, the reception of the SL CSI report from the UE based on the SL CSI report being multiplexed with the at least one other SL CSI report.

Aspect 23 may be combined with any of aspects 16-22 and includes that the SL CSI report is multiplexed with at least one SL HARQ-ACK transmission, the reception of the SL CSI report from the UE based on the SL CSI report being multiplexed with the at least one HARQ-ACK transmission.

Aspect 24 may be combined with any of aspects 16-23 and includes that the SL CSI report is multiplexed with the at least one UL transmission, the reception of the SL CSI report from the UE based on the SL CSI report being multiplexed with the at least one UL transmission.

Aspect 25 may be combined with any of aspects 16-24 and includes that the at least one UL transmission includes UCI.

Aspect 26 may be combined with any of aspects 16-25 and includes that the at least one processor is further configured to decode the SL CSI report separately from the at least one UL transmission.

Aspect 27 may be combined with any of aspects 16-26 and includes that the reception of the SL CSI report based on the priority of the SL CSI report includes the SL CSI report being dropped when the priority of the SL CSI report is lower than the priority of the one or more of the at least one UL transmission or the at least one other SL transmission.

Aspect 28 may be combined with any of aspects 16-27 and further includes a transceiver coupled to the at least one processor.

Aspect 29 is a method of wireless communication for implementing any of aspects 1-28.

Aspect 30 is an apparatus for wireless communication including means for implementing any of aspects 1-28.

Aspect 31 is a computer-readable medium storing computer executable code, the code when executed by at least one processor causes the at least one processor to implement any of aspects 1-28.

What is claimed is:

1. An apparatus for wireless communication at a user equipment (UE), comprising:
    a memory; and
    at least one processor coupled to the memory and configured to:
        determine a sidelink (SL) channel state information (CSI) report corresponding to one or more SL transmissions between the UE and at least one other UE;
        determine a priority of the SL CSI report on an uplink (UL) channel in association with a priority of one or more of at least one UL transmission or at least one other SL transmission; and
        transmit, to a base station via the uplink channel, the SL CSI report based on the priority of the SL CSI report on the UL channel in association with the priority of the one or more of the at least one UL transmission or the at least one other SL transmission.

2. The apparatus of claim 1, wherein the at least one processor is further configured to receive the SL CSI report from the at least one other UE, wherein the SL CSI report is determined based on the reception of the SL CSI report from the at least one other UE.

3. The apparatus of claim 1, wherein the at least one processor is further configured to generate the SL CSI report at the UE, wherein the SL CSI report is determined based on the generation of the SL CSI report at the UE.

4. The apparatus of claim 3, wherein the at least one processor is further configured to perform a CSI estimation procedure to generate the SL CSI report at the UE.

5. The apparatus of claim 1, wherein the priority of the SL CSI report corresponds to a fixed priority level associated with the one or more SL transmissions between the UE and the at least one other UE.

6. The apparatus of claim 1, wherein the priority of the SL CSI report is based on a priority level of SL data communicated between the UE and the at least one other UE.

7. The apparatus of claim 1, wherein the at least one processor is further configured to perform a communication associated with a SL-reference signal (SL-RS), wherein the SL CSI report is determined based on the communication associated with the SL-RS.

8. The apparatus of claim 1, wherein the at least one processor is further configured to multiplex the SL CSI report with at least one other SL CSI report, wherein the transmission of the SL CSI report to the base station is based on the SL CSI report being multiplexed with the at least one other SL CSI report.

9. The apparatus of claim 1, wherein the at least one processor is further configured to multiplex the SL CSI report with at least one SL hybrid automatic repeat request (HARQ)-acknowledgment (ACK) (HARQ-ACK) transmission, wherein the transmission of the SL CSI report to the base station is based on the SL CSI report being multiplexed with the at least one HARQ-ACK transmission.

10. The apparatus of claim 1, wherein the at least one processor is further configured to multiplex the SL CSI report with the at least one UL transmission, wherein the transmission of the SL CSI report to the base station is based on the SL CSI report being multiplexed with the at least one UL transmission.

11. The apparatus of claim 10, wherein the at least one UL transmission includes uplink control information (UCI).

12. The apparatus of claim 10, wherein the at least one processor is further configured to encode the SL CSI report separately from the at least one UL transmission.

13. The apparatus of claim 1, wherein the UL channel for transmission of the SL CSI report corresponds to at least one of a physical uplink shared channel (PUSCH) or a physical uplink control channel (PUCCH).

14. The apparatus of claim 1, wherein to transmit the SL CSI report based on the priority of the SL CSI report the at least one processor is further configured to drop the transmission of the SL CSI report based on the priority of the SL CSI report being lower than the priority of the one or more of the at least one UL transmission or the at least one other SL transmission.

15. The apparatus of claim 1, further comprising a transceiver coupled to the at least one processor.

16. An apparatus for wireless communication at a base station, comprising:
a memory; and
at least one processor coupled to the memory and configured to:
determine a priority of a sidelink (SL) channel state information (CSI) report corresponding to one or more SL transmissions between a user equipment (UE) and at least one other UE, the priority of the SL CSI report determined for an uplink (UL) channel in association with a priority of one or more of at least one UL transmission or at least one other SL transmission; and
receive, from the UE on the uplink channel, the SL CSI report based on the priority of the SL CSI report on the UL channel being determined in association with the priority of the one or more of the at least one UL transmission or the at least one other SL transmission.

17. The apparatus of claim 16, wherein the SL CSI report is received from the at least one other UE via the UE.

18. The apparatus of claim 16, wherein the SL CSI report is indicative of a CSI estimation performed at the UE or the at least one other UE.

19. The apparatus of claim 16, wherein the priority of the SL CSI report corresponds to a fixed priority level associated with the one or more SL transmissions between the UE and the at least one other UE.

20. The apparatus of claim 16, wherein the priority of the SL CSI report is based on a priority level of SL data communicated between the UE and the at least one other UE.

21. The apparatus of claim 16, wherein the at least one processor is further configured to transmit, to the UE, a trigger for a SL-reference signal (SL-RS), wherein the SL CSI report is received based on the trigger transmitted for the SL-RS.

22. The apparatus of claim 16, wherein the SL CSI report is multiplexed with at least one other SL CSI report, the reception of the SL CSI report from the UE based on the SL CSI report being multiplexed with the at least one other SL CSI report.

23. The apparatus of claim 16, wherein the SL CSI report is multiplexed with at least one SL hybrid automatic repeat request (HARQ)-acknowledgment (ACK) (HARQ-ACK) transmission, the reception of the SL CSI report from the UE based on the SL CSI report being multiplexed with the at least one HARQ-ACK transmission.

24. The apparatus of claim 16, wherein the SL CSI report is multiplexed with the at least one UL transmission, the reception of the SL CSI report from the UE based on the SL CSI report being multiplexed with the at least one UL transmission.

25. The apparatus of claim 24, wherein the at least one UL transmission includes uplink control information (UCI).

26. The apparatus of claim 24, wherein the at least one processor is further configured to decode the SL CSI report separately from the at least one UL transmission.

27. The apparatus of claim 16, wherein the reception of the SL CSI report based on the priority of the SL CSI report includes the SL CSI report being dropped when the priority of the SL CSI report is lower than the priority of the one or more of the at least one UL transmission or the at least one other SL transmission.

28. The apparatus of claim 16, further comprising a transceiver coupled to the at least one processor.

29. A method of wireless communication at a user equipment (UE), comprising:
determining a sidelink (SL) channel state information (CSI) report corresponding to one or more SL transmissions between the UE and at least one other UE;
determining a priority of the SL CSI report on an uplink (UL) channel in association with a priority of one or more of at least one UL transmission or at least one other SL transmission; and
transmitting, to a base station via the uplink channel, the SL CSI report based on the priority of the SL CSI report on the UL channel in association with the priority of the one or more of the at least one UL transmission or the at least one other SL transmission.

30. A method of wireless communication at a base station, comprising:
determining a priority of a sidelink (SL) channel state information (CSI) report corresponding to one or more SL transmissions between a user equipment (UE) and at least one other UE, the priority of the SL CSI report determined for an uplink (UL) channel in association with a priority of one or more of at least one UL transmission or at least one other SL transmission; and
receiving, from the UE on the uplink channel, the SL CSI report based on the priority of the SL CSI report on the UL channel being determined in association with the priority of the one or more of the at least one UL transmission or the at least one other SL transmission.

* * * * *